Nov. 28, 1961 R. W. KETCHLEDGE 3,010,654

SIGNAL COMPARISON SYSTEM

Filed Sept. 23, 1957 2 Sheets-Sheet 1

INVENTOR
R. W. KETCHLEDGE
BY
ATTORNEY

Nov. 28, 1961 R. W. KETCHLEDGE 3,010,654

SIGNAL COMPARISON SYSTEM

Filed Sept. 23, 1957 2 Sheets-Sheet 2

INVENTOR
R. W. KETCHLEDGE
BY

ATTORNEY

United States Patent Office 3,010,654

Patented Nov. 28, 1961

3,010,654
SIGNAL COMPARISON SYSTEM

Raymond W. Ketchledge, Whippany, N.J., assignor to Bell Telephone Laboratories, Incorporated, New York, N.Y., a corporation of New York Filed Sept. 23, 1957, Ser. No. 685,688
17 Claims. (Cl. 235—175)

This invention relates to electrical signal comparison systems and more particularly to systems for comparing binary code signals.

Computing systems shown in the prior art employ various electronic devices to compare two numbers and provide a signal indicative of their difference. The favored number forms for processing information in such devices are those permitting alternate representations of each digit; viz., a binary code in which a code group consists of a numerical sequence of any number of 0's or 1's in any permutation arrangement.

Devices shown in the prior art for subtracting multidigit binary numbers operate initially on the least significant digit of each number and proceed digit-by-digit toward the most significant digits, after which the resultant is obtained. This type of serial operation renders the devices incapable of performing at the high speeds demanded in many applications.

For example, high speed cathode ray tube storage applications depend upon rapid and accurate positioning of an electron beam in accordance with input information fed to the deflection circuitry of the tube in parallel binary form. Highly concentrated storage of information on the beam target necessitates employment of a monitoring system to assure beam position accuracy. Such a system is disclosed in the application of C. W. Hoover, Jr. and R. W. Ketchledge, Serial No. 581,073, filed April 27, 1956, now Patent No. 2,855,540 issued October 7, 1958. Output signals in parallel binary form are received from the beam target indicative of the present beam position. These signals are compared with the input information signals, and resultant difference signals are fed to the tubes' deflection circuitry to correct any errors in beam position. Optimum operation of such a storage system requires extremely rapid access to and readout of the stored information. The servo comparison circuitry therefore must be compatible with the operating speeds of the other elements in the system. Direct analog subtraction as shown in the prior art would severely hinder the accuracy and speed of this operation.

In accordance with my invention, a binary number comparison system is disclosed which satisfies the high speed servo correction demands of such a storage application. This system receives all of the digits of two multidigit binary numbers simultaneously, compares corresponding digits under control of the most significant digits, and provides an output indicative of the exact magnitude and sign of the difference between the compared numbers. The present invention is adapted particularly to comparison of two numbers in the conventional binary code.

It is an object of this invention to provide a high speed binary number comparison system.

It is another object of this invention to compare two numbers in conventional binary code form so as to provide an indication of their relative magnitudes or sign and the exact difference in magnitude.

The above objects are attained in accordance with an illustrative embodiment of the invention by the application to a comparator network of each of the various digits of a first binary number as one of two electrical signals, each digit being allotted a distinct input in one of several comparison positions of the comparator network. Each of the various digits of a second binary number to be compared with the first binary number is applied as one of two electrical signals to another input in the same position as the signal for the digit of corresponding significance in the former number. All digits are applied at the respective inputs simultaneously. Thus the most significant digits in the compared binary numbers are applied simultaneously to one position of the comparator via separate leads, succeeding digits of lesser significance being applied to other positions thereof in similar fashion. The various positions have individual outputs coupled to a common output which yields the relative magnitude or sign and the exact difference in magnitude of the compared binary numbers.

In the illustrative embodiments of this invention, each stage of the comparator comprises a series of logic circuits of the AND and OR variety. Logical AND circuits are variously known as gates or coincidence circuits and are employed generally throughout computer operation. Generally a logical AND gate is a circuit having a plurality of inputs and a single output and is so designed that an output signal is obtained only when like signals of a predetermined type are received simultaneously on each of the inputs. A logical OR gate is basically a circuit having a plurality of inputs and a single output and is designed to produce an output signal when signals of a predetermined type are received at one or more inputs.

A conventional subtractor circuit, as known in the art, proceeds in serial fashion to compare corresponding digits beginning with the least significant digits. The resultant is obtained only after all digit comparisons from least to most significant are completed in turn. For example, to subtract 75 from 121 in conventional fashion, the least significant digit (5) of the subtrahend is subtracted from the least significant digit (1) of the minuend, borrowing ten from the next more significant digit (2) of the minuend to provide a resultant of 6 for the least significant digit comparison. Similarly, a subtractor circuit as known in the art, operating on the same numbers in binary code form, proceeds through each digit comparison beginning with the least significant, and requires a finite delay in performing each digit comparison in turn.

In accordance with my invention, binary digit comparisons are conducted simultaneously in each position to determine the presence in each position of a digit match or mismatch. Each position is arranged to provide a comparison resultant indicative of this match or mismatch condition, and after proper weighting of each comparison resultant in accordance with its individual position significance in the compared numbers, a summation of the resultants will yield the sign and exact magnitude of the difference between the numbers in a fraction of the time required by the serial subtractor.

Further in accordance with my invention, each digit position is assigned a binary weighting corresponding to its relative significance in the compared numbers. For example, the binary weighting of the positions in a five-digit binary number will correspond to 16, 8, 4, 2, and 1 in the respective order of significance as derived from raising the radix (2) of the binary system to the power assigned each particular position.

The following example of simple subtraction will illustrate these factors:

| Decimal | | Conventional binary | | | | | |
|---|---|---|---|---|---|---|---|
| | Weighting | 16 | 8 | 4 | 2 | 1 | |
| | Position | A | B | C | D | E | |
| 26 | Minuend | 1 | 1 | 0 | 1 | 0 | |
| 20 | Subtrahend | 1 | 0 | 1 | 0 | 0 | |
| +6 | Resultant | 0 | +1 | −1 | +1 | 0 | |
| | Weighted | | +8 | −4 | +2 | | =+6 |

Rather than beginning with a comparison of the least significant digits and progressing serially through to the most significant digits as with the serial subtractor, comparisons of each pair of digits are performed simultaneously, and simple subtraction resultants of 0, +1 or −1 are obtained for each position. In this example, the circuit determines the presence of positive mismatches in positions B and D and provides +1 resultants in each instance. A negative mismatch in position C yields a −1 resultant, and matches in positions A and E produce 0 resultants. Each +1 or −1 resultant is weighted in accordance with the binary weighting of its position, and a summation of the weighted resultants, advantageously appearing as analog voltages, produces the desired exact magnitude of the difference between the compared numbers. The final resultant always takes the sign of the most significant digit mismatch which in this example occurs in position B.

Certain conventional binary code number comparisons provide a +1 resultant followed by a succession of −1 resultants. Upon weighting each comparison resultant with an analog voltage, it becomes necessary to subtract a series of negative voltages from a single positive voltage which in turn creates an accuracy problem as regards the final analog voltage resultant. This cancellation effect is remedied in accordance with one aspect of this invention by weighting the comparison resultants under the control of preceding more significant digit comparison resultants. Also the weighting of each comparison resultant may be a plurality of analog values corresponding to the binary significance of the digit comparison position. In this fashion, weighted comparison resultants of opposite sign are avoided and the consequent cancellation effect eliminated.

It is a feature of this invention that signals representing corresponding digits of two conventional binary code numbers to be compared be applied simultaneously to respective ones of a plurality of digit comparison circuits, and an output signal having the sign and the exact magnitude of their difference be derived from weighted signals determined by selected ones of said comparison circuits.

It is a more specific feature of this invention that digit comparisons be conducted simultaneously in distinct logic circuits, each circuit being arranged to provide one of a plurality of output signals proportional to a weighting assigned to the corresponding digit position dependent upon the comparison resultant and the resultants of comparisons conducted in more significant digit positions.

It is another feature of this invention that weighted signals from distinct digit positions be in either single or double the binary weighting assigned to the corresponding digit position and in positive or negative polarity.

A complete understanding of this invention and of these and various other features thereof may be gained from consideration of the following detailed description and the accompanying drawing, in which.

Figure 1:
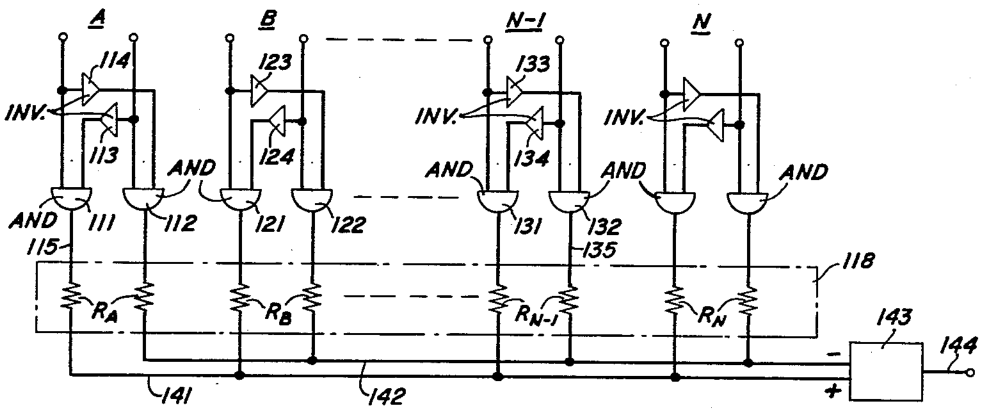
FIG. 1 is a schematic representation of one embodiment of this invention.

Referring now to the circuit of FIG. 1, digits of a first conventional binary code number $a_1a_2a_{n-1}a_n$, representing the minuend of the comparison, and a second conventional binary code number $b_1b_2b_{n-1}b_n$, representing the subtrahend of the comparison, are applied simultaneously to the comparison circuit comprising positions A through N.

The compared binary code numbers are not limited to the four-digit length illustrated but may comprise any number of digits. For each additional pair of digits of corresponding significance in the compared numbers, positioned circuitry, such as that in position B, is added to the comparator. Each position A through N receives a pair of digits, each digit having like significance in the compared numbers; thus position A, the most significant digit comparison position, receives digits $a_1$ and $b_1$, the most significant digit in each of the compared numbers.

Each digit is applied as a selected one of two discrete voltage levels on the corresponding input leads. The two discrete voltage levels represent the binary digits "one" and "zero," and the explanation hereinafter will allude to the condition of the circuit in terms of the presence of a "one" or a "zero."

The comparisons conducted in each position A–N will yield an indication of a match, positive mismatch or negative mismatch between the compared digits. A match will be indicated if the compared digits are alike; i.e., both "one" or both "zero." If the digit of the minuend is a "one" and the digit of the subtrahend is a "zero" a positive mismatch will be indicated, and for the reverse stiuation, a negative mismatch will be indicated.

Each position A–N comprises a comparison portion and a weighting portion. The comparison portion of each position, such as position A, comprises two AND gates 111 and 112 and two inverter circuits 113 and 114. The weighting portion comprises elements of an analog converter 118.

Figure 3A:
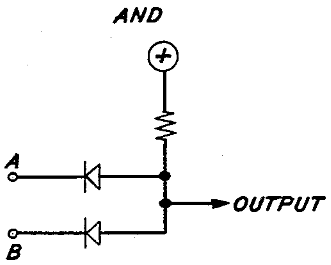
FIG. 3 illustrates simple schematic representations of various logic circuits which may be employed in the embodiments of FIGS. 1 and 2.
Figure 3B:
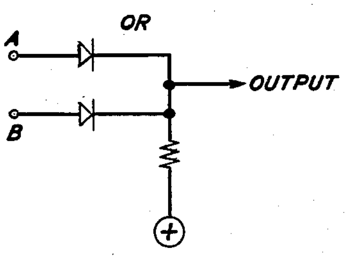
Figure 3C:
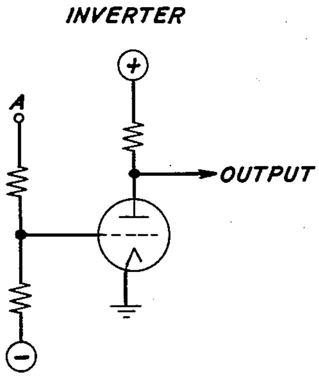

FIGS. 3A, 3B and 3C, respectively, illustrate typical AND and OR gates utilizing diodes and an inverter circuit utilizing a triode. The logic components utilized in the circuit of FIG. 1 may take these or comparable forms as desired. Each AND gate, shown as a clear semicircle in FIG. 1, is arranged to provide an output "one" signal only if "one" signals are presented simultaneously at all of the inputs thereto. Each OR gate, shown as a semicircle traversed by the input leads in FIG. 1, provides an output "one" signal if a "one" signal is present on at least one of the inputs thereto. Each inverter circuit, designated INV. in FIG. 1, provides an output "one" or "zero" signal corresponding to the inverse of the input "one" or "zero" signal corresponding to the inverse of the input "one" or "zero" signal applied thereto.

The logic involved in the binary number comparison conducted in the circuit of FIG. 1 may be expressed in algebraic form, utilizing the terminology of Boolean algebra as follows:

$$\text{Positive output } +V_1 = a_1b_1'$$
$$\text{Negative output } -V_1 = a_1'b_1$$

and the resultant is the sum of the individual positive outputs plus the sum of the individual negative outputs.

A comparison of two input numbers in conventional binary code will serve to demonstrate the operation of the circuit of FIG. 1. Assume that the number 12 is to be compared with the number 6, the former being the reference number or minuend. Table I illustrates the elements of the problem:

I

| Decimal | | Conventional binary | | | | |
|---|---|---|---|---|---|---|
| | Weighting | 8 | 4 | 2 | 1 | |
| | Position | A | B | $N-1$ | N | |
| 12 | $a_1a_2a_{n-1}a_n$ | 1 | 1 | 0 | 0 | |
| 6 | $b_1b_2b_{n-1}b_n$ | 0 | 1 | 1 | 0 | |
| — | | | | | | |
| | | $+x$ | 0 | $-x$ | 0 | |
| +6 | Result (Fig. 1) | +8 | | −2 | | =+6 |
| +6 | Result (Fig. 2) | | +4 | | +1 | +1=+6 |

The correct resultant is +6. Thus, the circuit of FIG. 1 must provide a plus sign or relative magnitude output signal and a difference magnitude output signal having a binary weighting of 6.

It is noted that the compared numbers in conventional binary code form reveal a positive mismatch in position A, the most significant digit position. A negative mismatch is present in position $N-1$ and positions B and N reveal matches. The comparison portion of each position in the circuit of FIG. 1 provides an output indicative of the match or mismatch condition present in its position in the manner described hereinafter.

Position A receives a "one" and a "zero" on the respective $a_1$ and $b_1$ input leads so that comparison AND gate 111 receives a "one" from input $a_1$ and a "one" from input $b_1$ through inverter 113. Similarly, comparison AND gate 112 receives a "zero" from input $b_1$ and a "zero" from input $a_1$ through inverter 114. Thus only comparison AND gate 111 receives "ones" on each of its input leads and provides an output "one" signal. The "one" signal is transmitted over lead 115 to the $R_A$ section on analog converter 118. The $R_A$ section of analog converter 118 gives this output signal the appropriate analog weighting of position A, which in this instance is 8.

Position B receives the next most significant digits $a_2$ and $b_2$ of the two input numbers. In this instance a "one" appears on each of the input leads. Since each of the comparison AND gates 121 and 122 in position B receives the inverse of one of the input digits through inverters 123 and 124, no output is provided by either AND gate in this position.

A similar situation is evident in position N where the input digits again match.

Comparison AND gate 132 in position $N-1$ receives the "one" $b_{n-1}$ input and a "one" input from $a_{n-1}$ through inverter 133. Receipt of "one" signals at each of its inputs activates comparison AND gate 132 to transmit a "one" signal over the negative output lead 135 to the $R_{N-1}$ section of analog converter 118. The $R_{N-1}$ section gives this output signal the appropriate analog weighting of position $N-1$, which in this instance is 2. The weighted output signal from position A over lead 115 and through the $R_A$ section of analog converter 118 is transmitted over positive output lead 141 to circuit 143. Similarly, the output of position $N-1$ is transmitted over negative output lead 142 to circuit 143. All of the weighted output signals received on the positive output lead 141 add to form a single positive output signal in circuit 143. Similarly, all of the weighted output signals received on negative output lead 142 add together to form a single negative output signal in circuit 143. The positive and negative totals are combined algebraically in circuit 143 to indicate the exact difference magnitude between the compared numbers on final output lead 144.

Since the most significant digit mismatch, in this instance occurring in position A, receives the largest binary weighting, it will control the sign of the resultant. In this instance the most significant digit mismatch receives a +8 weighting and the only other mismatch receives a −2 weighting, so that the algebraic addition of the analog values received in circuit 143 yields a resultant of +6.

Assume now that the number 8 is to be compared with the number 7, the former being the reference number or minuend. Table II illustrates this problem:

II

| Decimal | | Conventional binary | | | | |
|---|---|---|---|---|---|---|
| | Weighting | 8 | 4 | 2 | 1 | |
| | Position | A | B | $N-1$ | N | |
| 8 | $a_1a_2a_{n-1}a_n$ | 1 | 0 | 0 | 0 | |
| 7 | $b_1b_2b_{n-1}b_n$ | 0 | 1 | 1 | 1 | |
| — | | | | | | |
| | | $+x$ | $-x$ | $-x$ | $-x$ | |
| +1 | | +8 | −4 | −2 | −1 | =+1 |

The correct resultant is +1. The circuit of FIG. 1 will operate in similar fashion to that described in the preceding example; in this instance providing a positive mismatch in position A and negative mismatches in positions B, $N-1$ and N. Thus each position provides an output signal to the analog converter 118, which in turn will provide a positive weighted output signal of +8 in position A to positive output lead 141 and negative weighted output signals of −4, −2, −1, in positions B, $N-1$ and N, respectively, to negative output lead 142.

Thus, in this instance, it becomes necessary to subtract a series of negative voltages from a single positive voltage, which in turn creates an accuracy problem as regards the analog voltage resultant on lead 144. This cancellation effect, particularly serious in large number comparisons yielding small difference resultants, is an inherent weakness of comparisons conducted in conventional binary code.

Figure 2:
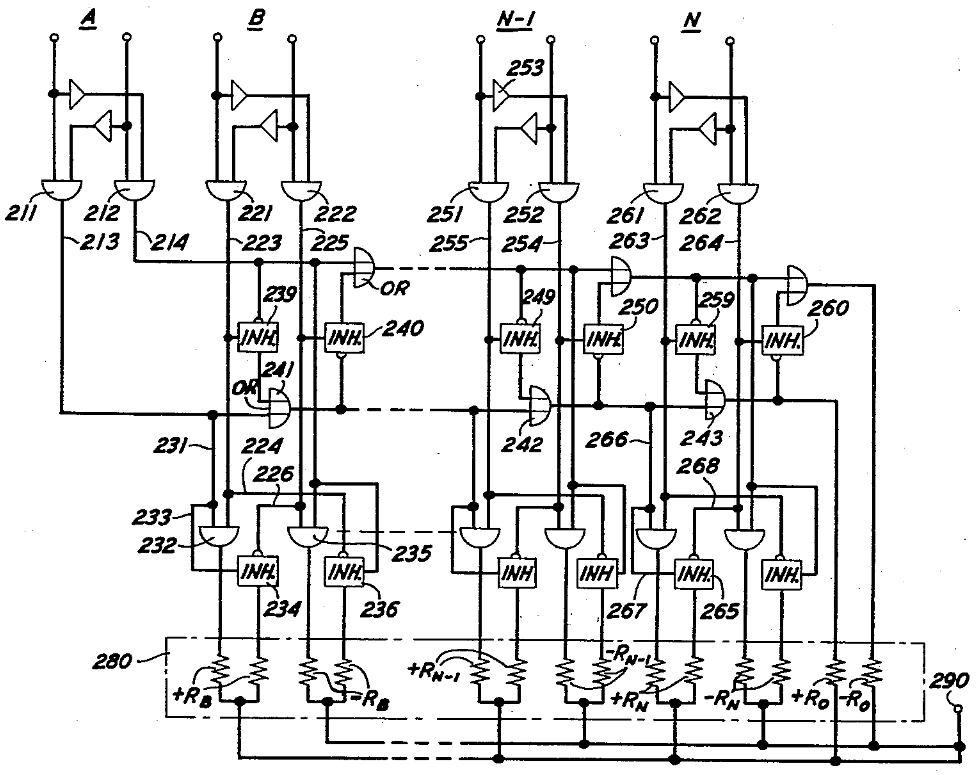
FIG. 2 is a schematic representation of another embodiment of this invention illustrating the aspect of cancellation control.

Referring now to the circuit of FIG. 2, a modification of the circuit arrangement of FIG. 1 is shown in which the resultant of each comparison is controlled by comparisions conducted in more significant digit positions. This modification, in accordance with this invention, overcomes the cancellation effect. The basic comparison circuits in positions A through N are identical to those shown in the circuit of FIG. 1, comprising two AND gates and two inverters. The output of each comparison circuit in this instance, however, is directed to the position comparing digits of lesser significance rather than directly to the analog converter as in the circuit of FIG. 1. Thus the comparison circuit output signals are carried to lesser significant digit positions for control purposes and will be referred to hereinafter as a "carry."

The carry circuit portion of each position other than the most significant digit position, A, comprises two inhibitors and two OR gates. The output portion of each position, other than position A, comprises two AND gates, two inhibitors and elements of an analog converter.

Figure 3D:
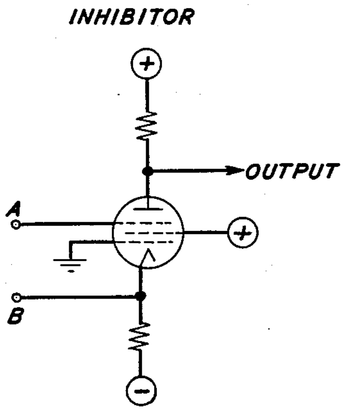

FIG. 3D illustrates a typical inhibitor utilizing a pentode. Each inhibitor, designated INH in FIG. 2, provides an output signal if a signal is present on one of its input leads and not on its other, inhibit, input lead.

The portion of the analog converter in each position, other than position A, advantageously comprises four distinct weighting elements connected so as to provide single or double weighted outputs for positive or negative signals from the comparison circuits.

The operation of the circuit in FIG. 2 conforms to the following rules:

(1) From the position detecting the most significant digit mismatch provide a carry, having the same sign as the mismatch, toward less significant digit positions.

(2) From any succeeding position producing a match, provide an output corresponding to the binary weighting of that position and having the sign of the carry.

(3) From any succeeding position producing a mismatch in the same sense as the most significant digit mismatch, provide an output corresponding to twice the binary weighting of that position and having the sign of the carry.

(4) Provide an output corresponding to the binary weighting of the least significant digit position and having the sign of the carry.

(5) Total the outputs for the final resultant.

For example, if the most significant digit mismatch is detected in position A and is positive, a positive carry will be transmitted to each less significant digit position B, $N-1$ and N in accordance with rule 1. If a match is detected in position B, a positive output corresponding to the weighting of position B will be provided in accordance with rule 2. If a negative mismatch is detected in position N-1, no output is provided for that position. If a positive mismatch is detected in position N, a positive output corresponding to twice the binary weighting of position N will be provided in accordance with rule 3. Also a positive output corresponding to the binary weighting of position N is provided in accordance with rule 4. The weighted outputs, all positive, are totaled to provide the final positive resultant in accordance with rule 5.

A comparison of two input numbers in conventional binary code will serve to demonstrate the operation of the circuit of FIG. 2. Assume again that the number 12 is to be compared with the number 6 as in the example given for the circuit of FIG. 1. Table I is repeated here for convenience in describing the new method of achieving the desired resultant:

I

| Decimal | | Conventional binary | | | | |
|---|---|---|---|---|---|---|
| | Weighting | 8 | 4 | 2 | 1 | |
| | Position | A | B | $N-1$ | N | |
| 12 | $a_1a_2a_{n-1}a_n$ | 1 | 1 | 0 | 0 | |
| 6 | $b_1b_2b_{n-1}b_n$ | 0 | 1 | 1 | 0 | |
| — | | | | | | |
| | | $+x$ | 0 | $-x$ | 0 | |
| +6 | Result (Fig. 1) | +8 | | −2 | | =+6 |
| +6 | Result (Fig. 2) | | +4 | | +1 | +1=+6 |

The correct resultant again is +6 but in this instance, as indicated in Table I, the circuit of FIG. 2 arrives at the correct resultant by provision of only positive outputs from selected comparison circuits.

Position A in FIG. 2 receives a "one" and a "zero" on the respective $a_1$ and $b_1$ input leads, so that comparison AND gate 211 provides a "one" output signal to positive carry lead 213. Comparison AND gate 212, receiving "zero" signals on its input leads, fails to provide an output signal on the negative carry lead 214.

Position B reecives the next most significant digits $a_2$ ("one") and $b_2$ ("one") of the two input numbers. Thus comparison AND gates 221 and 222 in position B each receive the inverse of one of the input digits and fail to provide output signals. The "one" signal on positive carry lead 213 is transmitted over lead 231 to output AND gate 232 and over lead 233 to inhibit circuit 234. The other input of output AND gate 232 receives the output signal of comparison AND gate 221 over lead 223. Since this output is a "zero" in this instance, output AND gate 232 fails to provide a "one" output. The inhibit input of inhibit circuit 234 is energized by the output of comparison AND gate 222 over leads 225 and 226. Since the output of comparison AND gate 222 in this instance is a "zero" inhibitor circuit 234 will pass the "one" input signal on lead 233 through a $+R_B$ section of analog converter 280 so as to provide a positive analog output signal having the binary weighting of position B, which in this instance is 4.

The negative output section of position B, comprising output AND gate 235, inhibit circuit 236 and associated $-R_B$ sections of analog converter 280, is energized by signals over negative carry lead 214. Since negative carry lead 214 is not energized in this instance, the negative output section of position B fails to provide binary weighted output signals.

The "one" signal on positive carry lead 213 prevents the appearance of a "one" signal of negative carry lead 214 in less significant digit positions by its connection to inhibit circuits 240, 250 and 260 so as to inhibit the comparison output in each position which would normally energize negative carry lead 214 in less significant digit positions. The "one" signal on positive carry lead 213 is carried through each less significant digit position via OR gates 241, 242 and 243.

Turning now to position *N—1*, comparison AND gate 252 receives the "one" $b_{n-1}$ input and a "one" input from $a_{n-1}$ through inverter 253 so as to provide a "one" signal on its output lead 254. Comparison AND gate 251 fails to provide a "one" signal on its output lead 255. The combination of "one" signals on lead 254 from comparison AND gate 252 and on positive carry lead 213 fails to energize any of the gates in the output section of position $N-1$ so that no binary weighted output signals result.

In position N "zero" input signals are received on input leads $a_n$ and $b_n$ so that the comparison AND gates 261 and 262 in position N fail to provide "one" signals on their respective output leads 263 and 264. The "one" signal on positive carry lead 213 is received by inhibit circuit 265 over leads 266 and 267, which signal is not inhibited, since a "zero" signal appears at the inhibit input from comparison AND gate 262 over leads 264 and 268. Thus a positive analog output having the binary weighting of position N is provided by a $+R_N$ section of analog converter 280. The "one" signal on positive carry lead 213 also passes through the $+R_O$ section of analog converter 280, providing another positive output having the binary weighting of position N.

All of the weighted output signals are positive in this instance; i.e., +4 in position B, +1 in position N, and +1 after position N. These signals are transmitted to a common output terminal 290 which provides the final positive resultant, +6. Since no negative output signals can appear when positive output signals are present, there is no necessity for combining positive and negative totals to reach the final resultant, thus obviating the cancellation effect referred to hereinbefore.

The circuit of FIG. 2 is arranged to provide single and double binary weighted outputs in each position to implement every possible comparison. The comparison illustrated in Table III demonstrates a double binary weighted output and also a comparison involving a negative carry.

III

| Decimal | | Conventional binary | | | | |
|---|---|---|---|---|---|---|
| | Weighting | 8 | 4 | 2 | 1 | |
| | Position | A | B | $N-1$ | N | |
| 3 | $a_1a_2a_{n-1}a_n$ | 0 | 0 | 1 | 1 | |
| 12 | $b_1b_2b_{n-1}b_n$ | 1 | 1 | 0 | 0 | |
| — | | | | | | |
| | | $-x$ | $-x$ | $+x$ | $+x$ | |
| | Result (Fig. 1) | −8 | −4 | +2 | +1 | =−9 |
| −9 | Result (Fig. 2) | | −8 | | | −1=−9 |

The correct resultant is —9. The circuit of FIG. 2 will operate in similar fashion to that described in the preceding example; in this instance detecting a negative mismatch in positions A and B and positive mismatches in positions $N-1$ and N.

Position A will provide a "one" output signal from comparison AND gate 212 on negative carry lead 214. The negative carry signal serves to block initiation of a positive carry in less significant digit positions by activating the inhibit leads of inhibit circuits 239, 249 and 259. Position B also provides a "one" output signal from comparison AND gate 222, so that the negative output section of position B; viz., output AND gate 235 and inhibit circuit 236, will receive "one" signals on their respective input leads with the exception of the inhibit input to inhibit circuit 236. Thus output signals are transmitted through both negative $R_B$ sections of analog converter 280 providing an output resultant of double the binary weighting of position B, or in this instance —8.

The less significant digit positions *N—1* and N, detecting positive mismatches combined with the negative carry, fail to provide binary weighted output resultants. The "one" signal on negative carry lead 214 passes through the $R_O$ section of analog converter 280 to provide a negative output resultant having the binary weighting of position N, which is —1. The combined resultant of the negative output resultants thus is —9.

It is to be understood that the above-described arrangements are illustrative of the application of the principles of the invention. Numerous other arrangements may be devised by those skilled in the art without departing from the spirit and scope of the invention.

What is claimed is:

1. An electrical circuit for comparing two binary numbers comprising a plurality of comparison circuits each corresponding to a distinct digit position in the two numbers and each having a pair of digit signal inputs, means for applying pairs of electrical signals representing digits in positions of like significance in said two numbers simultaneously to individual of said comparison circuits, each digit signal input receiving a distinct one of the pair of digit signals applied to the corresponding comparison circuit, means for providing simultaneous outputs from each of said comparison circuits indicative of the relative magnitude of each pair of compared digits, an output terminal, and means electrically connected between said output terminal and said comparison circuits for combining said comparison circuit outputs.

2. An electrical circuit for indicating the sign and difference magnitude of two multidigit numbers comprising means for comparing electrical signals representing pairs of digits of the same significance in said numbers and for providing outputs responsive to comparison of electrical signals representing unlike digit pairs, weighting means connected to said comparing means, said weighting means imparting a distinct weighting corresponding to the significance of the positions of the compared digits to said outputs, and means for totaling said weighted comparison outputs.

3. An electrical circuit for comparing two binary numbers and for developing a single output signal corresponding to the exact magnitude of the difference between the two numbers comprising a distinct comparison circuit having a pair of digit signal inputs for each digit position in the binary numbers, means for applying electrical signals representing digits in like significance positions in said binary numbers simultaneously and in pairs to individual of said comparison circuits, each digit signal input receiving a distinct one of the pair of digit signals applied to the corresponding comparison circuit, means for altering certain of said outputs so as to give them a significance corresponding in a selected degree to the significance of the positions of the compared digits producing said outputs, an output terminal, and means for combining said altered outputs and applying the resultant to said output terminal.

4. An electrical circuit for comparing two binary numbers and for developing a single output signal corresponding to the exact magnitude of the difference between the two numbers comprising a distinct comparison circuit for each digit position in the binary numbers, means for applying electrical signals representing digits in like significance positions in said binary numbers simultaneously to individual of said comparison circuits, means for altering certain of said outputs so as to give them a significance corresponding in a selected degree to the significance of the positions of the compared digits producing said outputs, an output terminal, and means for combining said altered outputs and applying the resultant to said output terminal, said combining means comprising weighting means having respective values related to the significance of the corresponding digit position whereby distinct weightings are imparted to certain of said comparison circuit outputs.

5. An electrical circuit in accordance with claim 4 wherein said weighting means comprises analog conversion means.

6. An electrical circuit in accordance with claim 4 wherein said combining means further comprises means for adding algebraically said weighted comparison circuit outputs.

7. An electrical circuit for comparing two binary numbers to indicate the sign and exact magnitude of their difference comprising a plurality of logic comparison circuits, means for applying electrical signals representing digits in like significance positions in said binary numbers to individual of said comparison circuits, means for weighting certain of said comparison circuit outputs in accordance with the significance of the positions of the compared digits producing said outputs, and means for totaling said weighted outputs.

8. An electrical circuit for comparing two binary numbers comprising a plurality of comparison circuits each corresponding to a distinct digit position in the two numbers, means including a single input lead for each digit for applying electrical signals representing digits in like significance positions in said two numbers to individual of said comparison circuits, means for providing outputs from each of said comparison circuits indicative of the relative magnitudes of each pair of compared digits, and means for imparting a distinct weighting corresponding to the significance of the positions of the compared digits to certain of the resultants of said comparisons, the most significant of said weighted comparison resultants being indicative of the sign of the difference between said two binary numbers.

9. An electrical circuit in accordance with claim 8 and further comprising means for totaling said weighted comparison resultants to indicate the magnitude of the difference between said two binary numbers.

10. An electrical circuit in accordance with claim 8 wherein each of said comparison circuits comprises first and second coincidence logic circuits, said like significance digit signal applying means applying one digit signal and the inverse of the corresponding digit signal to said first coincidence logic circuit and applying said corresponding digit signal and the inverse of said one digit signal to said second coincidence logic circuit.

11. An electrical circuit for comparing two binary numbers to indicate the sign and exact magnitude of their difference comprising a plurality of comparison circuits each corresponding to a distinct digit position in the two numbers, means for applying digits in like significance positions in said two binary numbers to individual of said comparison circuits, distinct output indicating means connected to said comparison circuits for each digit position in the binary numbers following the most significant digit position, means connecting said comparison circuit for each position to said output indicating means in less significant digit positions, said output indicating means responsive to signals received over said connecting means in conjunction with signals received directly from said comparison circuit in the same digit position to provide distinct output signals, and means for totaling said distinct output signals.

12. An electrical circuit in accordance with claim 11 wherein said connecting means comprises positive and negative carry leads and further comprising inhibit means connected between said carry leads and said distinct comparison circuits in each digit position such that a signal on one of said carry leads inhibits transfer of a signal from a less significant digit comparison circuit to the other carry lead.

13. An electrical circuit for comparing two binary numbers comprising a plurality of comparison circuits each corresponding to a distinct digit position in said two numbers, means for applying digits in like significance positions in said two numbers to individual of said comparison circuits, distinct output indicating means connected to each of said comparison circuits other than the most significant digit comparison circuit and each having a plurality of output leads, means for applying a comparison circuit resultant of one of a first and second type to said output indicating means connected to each less significant digit position, means for blocking the application of said second type resultant to less significant output indicating means in response to receipt of said first type resultant from a more significant digit comparison circuit, distinct weighting means connected to individual of said output leads for providing a distinct weighting to signals received over said output leads, said output indicating means being responsive to receipt of various combinations of the corresponding and more significant digit comparison circuit resultants to provide signals on selected ones of said output leads, an output terminal, and means connected between said weighting means and said output terminal for totaling said weighted signals.

14. An electrical circuit in accordance with claim 13 wherein said means connecting said weighting means to said output terminal comprises a positive output lead and a negative output lead, said weighting means comprising weighting elements connected in pairs between said output indicating means for each position and said positive and negative output leads respectively, said pairs of weighting elements for each position imparting one of single and double the binary weighting corresponding to the significance of the positions of the compared digits to signals received over said output leads.

15. An electrical circuit for indicating the sign and difference magnitude of two multidigit numbers comprising individual means for comparing electrical signals representing each pair of digits in positions of the same significance in said numbers and for providing outputs responsive to comparison of electrical signals representing unlike digit pairs, weighting means connected to said comparing means and comprising a plurality of weighting elements corresponding to the significance of each digit pair, said weighting means imparting one of a plurality of distinct weightings corresponding to the significance of the positions of the compared digits to each of said comparison outputs in accordance with the combination of said comparison outputs received thereat, and means for totaling said weighted comparison outputs.

16. An electrical circuit for indicating the difference magnitude of two multidigit numbers comprising individual means for comparing electrical signals representing each pair of digits in positions of the same significance in said numbers and for providing outputs responsive to comparison of electrical signals representing unlike digit pairs, an output lead, a pair of weighting elements connected between at least certain of said individual comparing means and said output lead, and means for selectively applying currents from said comparing means through one or both of said weighting elements of each pair of weighting elements dependent on said comparisons of unlike digit pairs.

17. An electrical circuit for indicating the sign and difference magnitude of two multidigit numbers comprising individual means for comparing each pair of digits in positions of the same significance in said numbers and for providing outputs responsive to comparison of unlike digit pairs, positive and negative output leads, a plurality of first pairs of weighting elements, each of said first pairs corresponding in weighting to the significance of a distinct one of said digit positions and being connected to said positive output lead, a plurality of second pairs of weighting elements, each of said second pairs corresponding in weighting to a distinct one of said first pairs of weighting elements and being connected to said negative output lead, and means for applying said comparison outputs to said first and second pairs of weighting elements.

References Cited in the file of this patent

UNITED STATES PATENTS

| | | |
|---|---|---|
| 2,511,996 | Robineau | June 20, 1950 |
| 2,537,427 | Seid | Jan. 9, 1951 |
| 2,685,084 | Lippel | July 27, 1954 |
| 2,792,545 | Kamm | May 14, 1957 |
| 2,907,877 | Johnson | Oct. 6, 1959 |

OTHER REFERENCES

Nettell: Digital Methods in Control Systems, Electronic Engineering, vol. 28, No. 337, pp. 108–114, March 1956.